(12) United States Patent
Chen et al.

(10) Patent No.: US 12,038,652 B2
(45) Date of Patent: Jul. 16, 2024

(54) ELECTRICALLY CONTROLLABLE VIEWING ANGLE SWITCH DEVICE AND DISPLAY APPARATUS

(71) Applicant: Coretronic Corporation, Hsin-Chu (TW)

(72) Inventors: Ping-Yen Chen, Hsin-Chu (TW); Ying-Hsiang Chen, Hsin-Chu (TW); Chung-Yang Fang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/350,758

(22) Filed: Jul. 12, 2023

(65) Prior Publication Data

US 2024/0027845 A1 Jan. 25, 2024

Related U.S. Application Data

(60) Provisional application No. 63/390,973, filed on Jul. 21, 2022.

(30) Foreign Application Priority Data

Sep. 29, 2022 (CN) .......................... 202211212504.0

(51) Int. Cl.
*G02F 1/1339* (2006.01)
*G02F 1/13* (2006.01)
*G02F 1/1335* (2006.01)
*G02F 1/1337* (2006.01)

(52) U.S. Cl.
CPC ........ *G02F 1/13394* (2013.01); *G02F 1/1323* (2013.01); *G02F 1/133512* (2013.01); *G02F 1/133528* (2013.01); *G02F 1/1337* (2013.01)

(58) Field of Classification Search
CPC .......... G02F 1/13394; G02F 1/133512; G02F 1/133528; G02F 1/1337
See application file for complete search history.

(56) References Cited

U.S. PATENT DOCUMENTS

| 2013/0107174 A1* | 5/2013 | Yun | ................ G02B 30/28 349/200 |
| 2022/0004035 A1* | 1/2022 | Pan | ................ G02F 1/1323 |

FOREIGN PATENT DOCUMENTS

| TW | 200844613 | 11/2008 |
| TW | I755721 | 2/2022 |

\* cited by examiner

*Primary Examiner* — James A Dudek
(74) *Attorney, Agent, or Firm* — JCIPRNET

(57) ABSTRACT

An electrically controllable viewing angle switch device is provided with a first substrate, a second substrate, a liquid crystal layer, multiple spacers, and multiple light-shielding patterns. The first substrate and the second substrate are overlapped with each other. The liquid crystal layer and the multiple spacers are disposed between the first substrate and the second substrate. The multiple light-shielding patterns are disposed on the second substrate. The orthographic projection area of each spacer on the second substrate is less than or equal to the orthographic projection area of each light-shielding pattern on the second substrate. The orthographic projection of each spacer on the second substrate is located within the orthographic projection of each light-shielding pattern on the second substrate. A display apparatus using an electrically controllable viewing angle switch device is also provided, in which light leakage near the spacer is extremely slight.

10 Claims, 8 Drawing Sheets

ELECTRICALLY CONTROLLABLE VIEWING ANGLE SWITCH DEVICE AND DISPLAY APPARATUS

CROSS-REFERENCE TO RELATED APPLICATION

This application claims the priority benefits of U.S. provisional application Ser. No. 63/390,973, filed on Jul. 21, 2022 and China application serial no. 202211212504.0, filed on Sep. 29, 2022. The entirety of each of the above-mentioned patent applications is hereby incorporated by reference herein and made a part of this specification.

BACKGROUND

Technical Field

The disclosure relates to a display technology, and in particular, to an electrically controllable viewing angle switch device and a display apparatus.

Description of Related Art

Generally speaking, in order to allow viewers to watch together, a display apparatus usually has a display effect with a wide viewing angle. However, in some situations or occasions, such as browsing private web pages, confidential information or entering passwords in public, the display effect with the wide viewing angle may cause the screen to be peeped by others, resulting in the leakage of confidential information. In order to avoid the above situation, an anti-peep display apparatus adopting an electrically controllable liquid crystal cell is proposed, such that the display apparatus has a switchable anti-peep function. For example, the electrically controllable liquid crystal cell may include two electrode layers, a liquid crystal layer disposed between the two electrode layers, and alignment layers disposed between the electrode layers and the liquid crystal layer. The alignment layers may be used to define the axial direction of the optical axis of the liquid crystal layer.

Generally, the above-mentioned electrically controllable liquid crystal cell may use a ball spacer, a cylindrical spacer, or a photo spacer to control and maintain the thickness of the liquid crystal layer. Among them, the photo spacer made by the photolithographic process has gradually become the mainstream due to its elasticity and immobility. However, since the arrangement of liquid crystal molecules of the liquid crystal layer near the spacer is affected by the structure of the spacer, which results in light leakages near the spacer of the electrically controllable liquid crystal cell, thereby affecting the display quality and the anti-peep effect of the display apparatus.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an electrically controllable viewing angle switch device, in which light leakage near the spacer is extremely slight.

The disclosure provides a display apparatus with better display quality and anti-peep effect.

Other objectives and advantages of the disclosure may be further understood from the technical features disclosed in the disclosure.

To achieve one or part or all of the above objectives or other objectives, an embodiment of the disclosure provides a display apparatus. The display apparatus includes a display panel and an electrically controllable viewing angle switch device. The display panel has a display surface. The electrically controllable viewing angle switch device overlaps the display surface of the display panel. The electrically controllable viewing angle switch device includes a first substrate, a second substrate, a liquid crystal layer, multiple spacers, and multiple light-shielding patterns. The first substrate and the second substrate are overlapped with each other. The liquid crystal layer and the multiple spacers are disposed between the first substrate and the second substrate. The multiple light-shielding patterns are disposed on the second substrate. The orthographic projection area of each spacer on the second substrate is less than or equal to the orthographic projection area of each light-shielding pattern on the second substrate. The orthographic projection of each spacer on the second substrate is located within the orthographic projection of each light-shielding pattern on the second substrate.

In an embodiment of the disclosure, the above-mentioned electrically controllable viewing angle switch device of the display apparatus further includes a first alignment layer, a second alignment layer, a first polarizer, and a second polarizer. The first alignment layer is disposed on the first substrate and has a first alignment direction. The second alignment layer is disposed on the second substrate and has a second alignment direction. The second alignment direction is antiparallel or parallel to the first alignment direction. The first polarizer and the second polarizer are respectively disposed on the opposite sides of the liquid crystal layer, and have a first absorption axis and a second absorption axis, respectively. The first absorption axis is parallel to the second absorption axis.

In an embodiment of the disclosure, the above-mentioned electrically controllable viewing angle switch device of the display apparatus further includes the first alignment layer, the second alignment layer, the first polarizer, and the second polarizer. The first alignment layer is disposed on the first substrate and has a first alignment direction. The second alignment layer is disposed on the second substrate and has a second alignment direction. The first alignment direction is perpendicular to the second alignment direction. The first polarizer and the second polarizer are respectively disposed on the opposite sides of the liquid crystal layer, and have the first absorption axis and the second absorption axis, respectively. The first absorption axis is perpendicular to the second absorption axis.

In an embodiment of the disclosure, each spacer of the above-mentioned electrically controllable viewing angle switch device of the display apparatus has a first endpoint and a second endpoint opposite each other along a viewing angle control direction. Each light-shielding pattern has a third endpoint closer to the first endpoint and a fourth endpoint closer to the second endpoint along the viewing angle control direction. The spacing between the first endpoint and the third endpoint is different from the spacing between the second endpoint and the fourth endpoint.

In an embodiment of the disclosure, each spacer of the above-mentioned electrically controllable viewing angle switch device of the display apparatus is symmetrically disposed according to a first symmetry axis. Each light-shielding pattern is symmetrically disposed according to a second symmetry axis. The second symmetry axis of any one of the multiple light-shielding patterns is offset relative to the first symmetry axis of one of the spacers overlapping any of the multiple light-shielding patterns along the viewing angle control direction.

In an embodiment of the disclosure, each light-shielding pattern of the above-mentioned electrically controllable viewing angle switch device of the display apparatus has a height along the direction perpendicular to the display surface, and the height is less than or equal to 0.1 μm.

In an embodiment of the disclosure, the above-mentioned electrically controllable viewing angle switch device of the display apparatus further includes a planarization layer disposed on the second substrate and covering multiple light-shielding patterns. Each light-shielding pattern has a height along the direction perpendicular to the display surface, and the height is greater than 0.1 μm.

In an embodiment of the disclosure, the planarization layer of the electrically controllable viewing angle switch device has a first surface and a second surface facing away from the multiple light-shielding patterns, the first surface overlaps the light-shielding patterns and the second surface does not overlap the light-shielding patterns. The height difference between the first surface and the second surface relative to the substrate surface of the second substrate is less than or equal to 0.1 μm.

In an embodiment of the disclosure, the above-mentioned electrically controllable viewing angle switch device of the display apparatus further includes the first alignment layer, the second alignment layer, a first electrode layer, and a second electrode layer. The first alignment layer and the second alignment layer are respectively disposed on the first substrate and the second substrate. The first electrode layer is disposed on the first substrate and located between the first alignment layer and the first substrate. The second electrode layer is disposed on the second substrate and located between the second alignment layer and the second substrate. The multiple light-shielding patterns are disposed between the second substrate and the second electrode layer or between the second electrode layer and the second alignment layer.

In an embodiment of the disclosure, the multiple light-shielding patterns of the above-mentioned display apparatus are disposed on a substrate surface of the second substrate facing away from the liquid crystal layer.

To achieve one or part or all of the above objectives or other objectives, an embodiment of the disclosure provides an electrically controllable viewing angle switch device. The electrically controllable viewing angle switch device includes a first substrate, a second substrate, a liquid crystal layer, multiple spacers, and multiple light-shielding patterns. The first substrate and the second substrate are overlapped with each other. The liquid crystal layer and the multiple spacers are disposed between the first substrate and the second substrate. The multiple light-shielding patterns are disposed on the second substrate. The orthographic projection area of each spacer on the second substrate is less than or equal to the orthographic projection area of each light-shielding pattern on the second substrate. The orthographic projection of each spacer on the second substrate is located within the orthographic projection of each light-shielding pattern on the second substrate.

Based on the above, in the display apparatus of the embodiment of the disclosure, the electrically controllable viewing angle switch device is further provided with the light-shielding patterns in an area provided with the spacers, and the orthographic projection of the spacers on the substrate is located within the orthographic projection of the light-shielding patterns on the substrate. Accordingly, light leakage caused by the poor arrangement of the liquid crystal layer near the spacers may be effectively reduced, thereby improving the display quality and the anti-peep effect of the display apparatus.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWING

The accompanying drawings are included to provide a further understanding of the disclosure, and are incorporated in and constitute a part of this specification. The drawings illustrate of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component "component is directly "adjacent to" "B" component or one or more additional components are between "A" component and "B" component. Accordingly, the drawings and descriptions will be regarded as illustrative in nature and not as restrictive.

Figure 1:
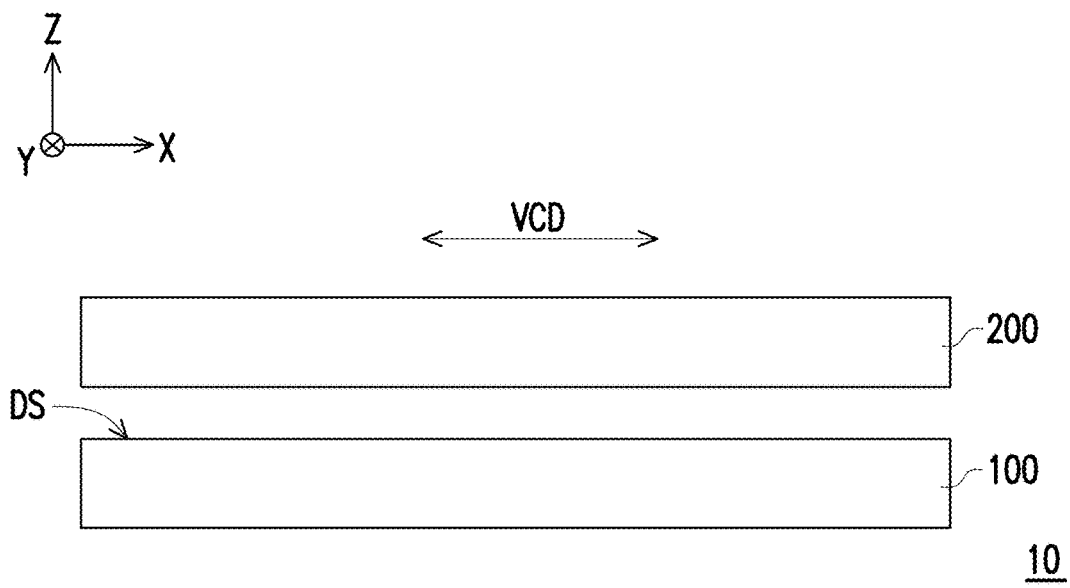
FIG. 1 is a schematic cross-sectional view of a display apparatus according to a first embodiment of the disclosure.
Figure 2:
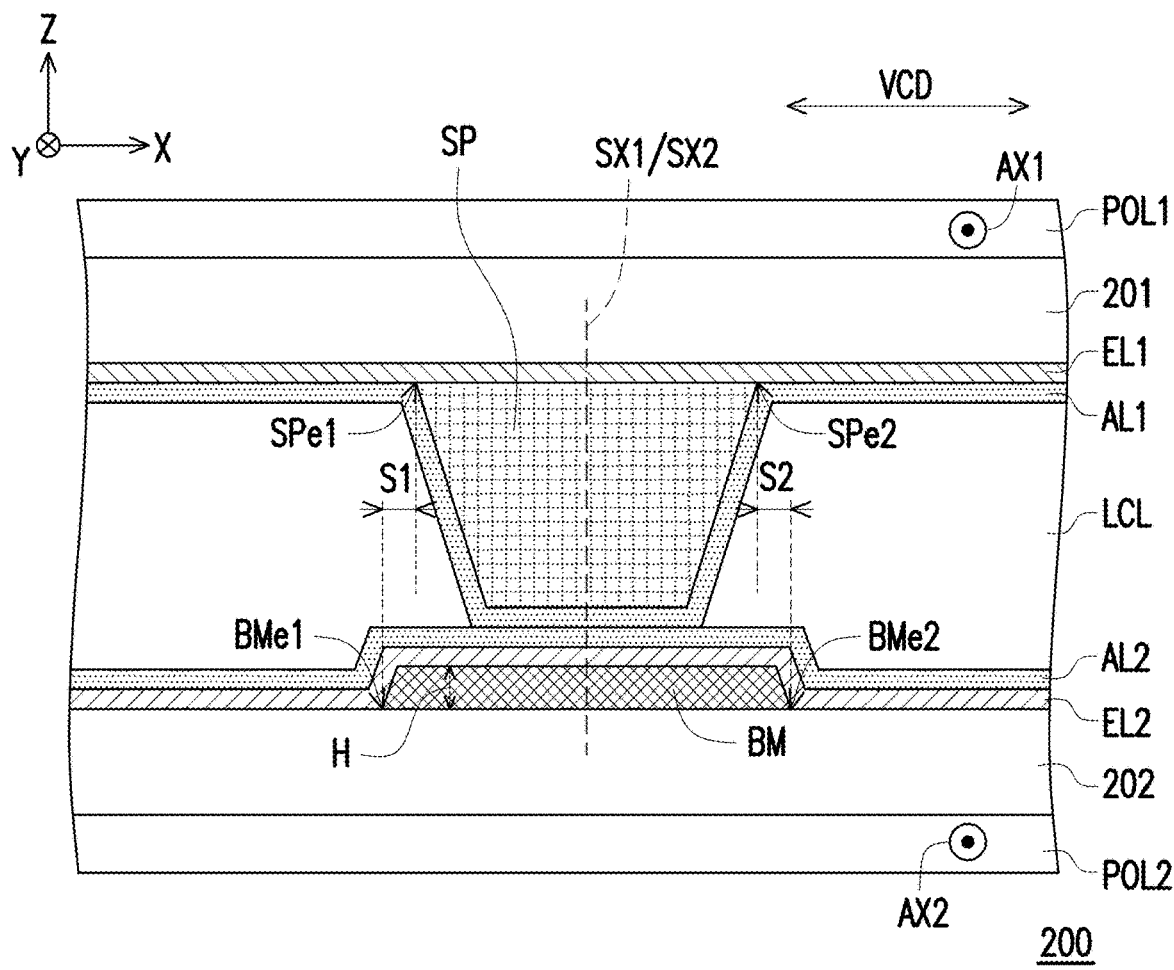
FIG. 2 is an enlarged schematic cross-sectional view of an electrically controllable viewing angle switch device of FIG. 1.
Figure 3:
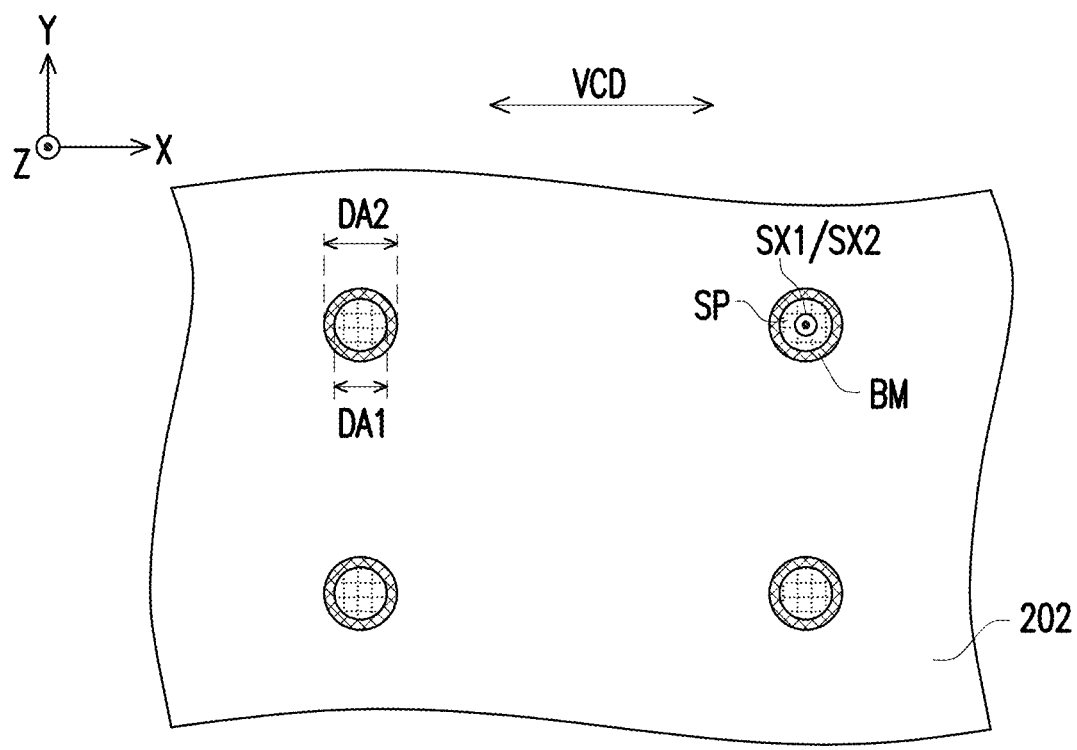
FIG. 3 is a schematic top view of the spacer and the light-shielding pattern of FIG. 2.
Figure 4:
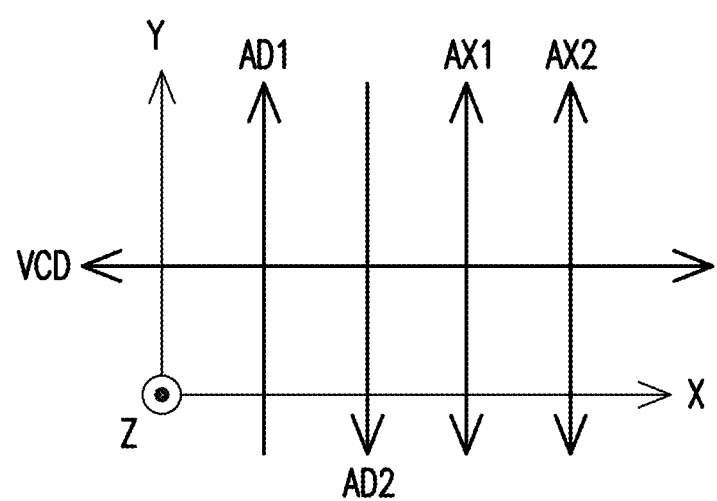
FIG. 4 is a schematic view of a relative relationship between an alignment direction of an alignment layer, an absorption axis of a polarizer, and a viewing angle control direction of the electrically controllable viewing angle switch device of FIG. 2.
Figure 5:
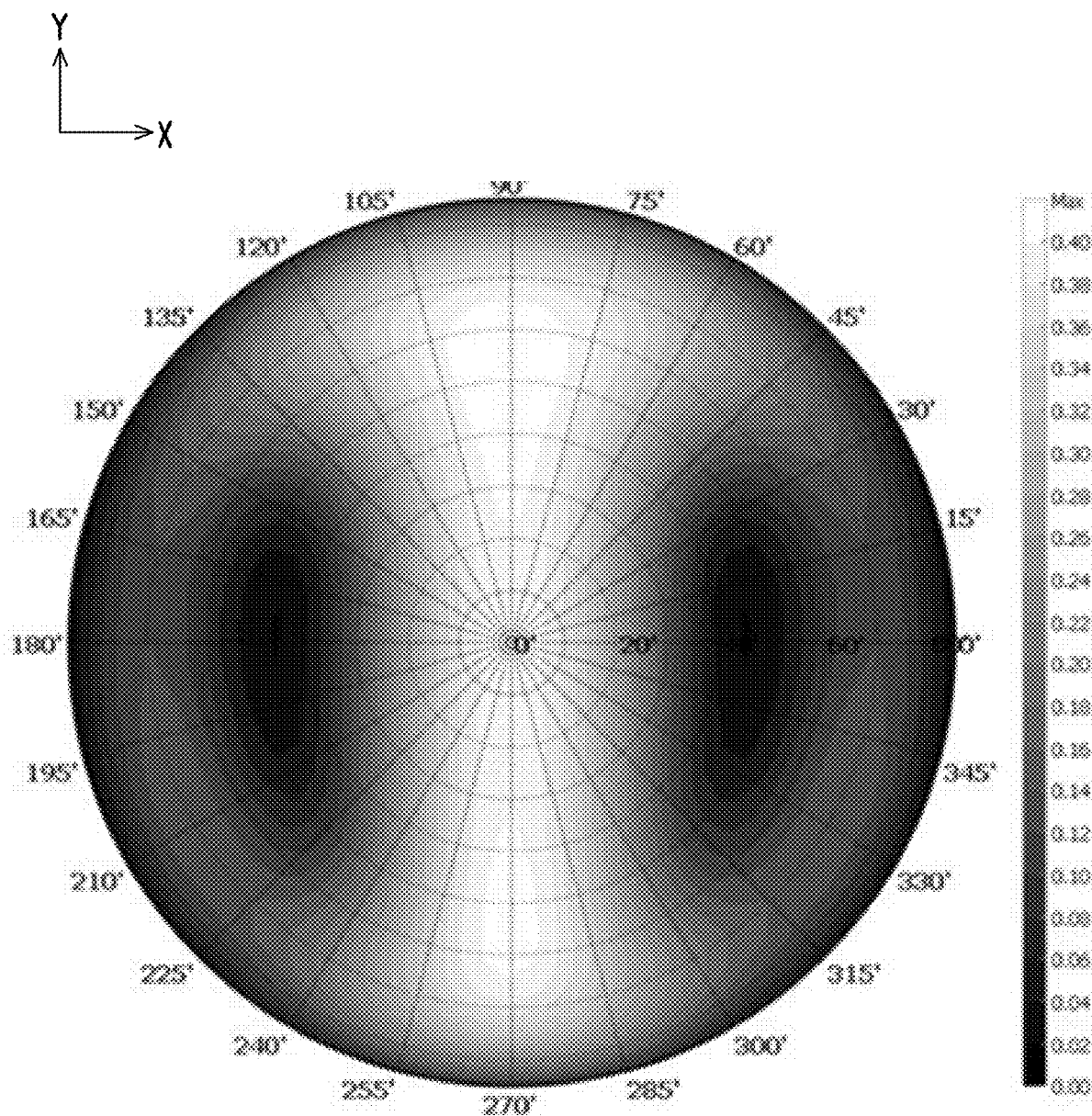
FIG. 5 is a transmittance distribution diagram of the electrically controllable viewing angle switch device of FIG. 1 operating in an anti-peep mode.

FIG. 1 is a schematic cross-sectional view of a display apparatus according to a first embodiment of the disclosure. FIG. 2 is an enlarged schematic cross-sectional view of an electrically controllable viewing angle switch device of FIG. 1. FIG. 3 is a schematic top view of the spacer and the light-shielding pattern of FIG. 2. FIG. 4 is a schematic view of a relative relationship between alignment directions of alignment layers, absorption axes of polarizers, and a viewing angle control direction of the electrically controllable viewing angle switch device of FIG. 2. FIG. 5 is a transmittance distribution diagram of the electrically controllable viewing angle switch device of FIG. 1 operating in an anti-peep mode.

Referring to FIG. 1, FIG. 2, and FIG. 3, a display apparatus 10 includes a display panel 100 and an electrically controllable viewing angle switch device 200. The display panel 100 has a display surface DS. The electrically controllable viewing angle switch device 200 is disposed to overlap the display surface DS of the display panel 100 and has a viewing angle control direction VCD. It should be explained first that the display apparatus 10 has a viewing angle range (e.g., normalized brightness greater than 5%) that may be electrically controllable and switchable in the viewing angle control direction VCD. For example, when the electrically controllable viewing angle switch device 200 is enabled, the viewing angle range of the display panel 100 in the viewing angle control direction VCD may change. For example, to reduce the viewing angle range, the difference in the viewing angle range when the electrically controllable viewing angle switch device 200 is enabled or disabled, is, for example, greater than 15 degrees. In particular, in the embodiment, the viewing angle control direction VCD is, for example, the X direction and the -X direction.

In the embodiment, the display panel 100 may be a self-luminous display panel (e.g., a micro-LED panel, a mini-LED panel, or an OLED panel) or a non-self-luminous display panel (e.g., a liquid crystal display panel). It should be understood that, if the display panel 100 is a non-self-luminous display panel, a backlight module may also be disposed on the side of the display panel 100 facing away from the display surface DS as a required illumination light source.

The electrically controllable viewing angle switch device 200 includes a first substrate 201, a second substrate 202, a liquid crystal layer LCL, multiple spacers SP, and multiple light-shielding patterns BM. The first substrate 201 and the second substrate 202 are overlapped with each other. The liquid crystal layer LCL is disposed between the first substrate 201 and the second substrate 202. The orthographic projection area of each spacer SP on the second substrate 202 (or the first substrate 201) is less than or equal to the orthographic projection area of each light-shielding pattern BM on the second substrate 202. The orthographic projection of the spacers SP on the second substrate 202 is located within the orthographic projection of the light-shielding patterns BM on the second substrate 202, as shown in FIG. 3.

In detail, referring to FIG. 2 and FIG. 4 at the same time, the electrically controllable viewing angle switch device 200 more optionally includes a first alignment layer AL1, a second alignment layer AL2, a first polarizer POL1, and a second polarizer POL2. At least a portion of the first alignment layer AL1 is disposed on the first substrate 201 and located between the liquid crystal layer LCL and the first substrate 201. The second alignment layer AL2 is disposed on the second substrate 202 and located between the liquid crystal layer LCL and the second substrate 202. The first alignment layer AL1 and the second alignment layer AL2 have a first alignment direction AD1 and a second alignment direction AD2, respectively. In the embodiment, the first alignment direction AD1 of the first alignment layer AL1 is antiparallel to the second alignment direction AD2 of the second alignment layer AL2, but the disclosure is not limited hereto. In other embodiments not shown, the first alignment direction of the first alignment layer may also be parallel to the second alignment direction of the second alignment layer. It should be noted that, in the embodiment, the first alignment direction AD1 and the second alignment direction AD2 may be perpendicular to the viewing angle control direction VCD.

The first polarizer POL1 and the second polarizer POL2 are respectively disposed on the opposite sides of the liquid crystal layer LCL. For example, the first polarizer POL1 may be disposed on the side surface of the first substrate 201 facing away from the liquid crystal layer LCL, and the second polarizer POL2 may be disposed on the side surface of the second substrate 202 facing away from the liquid crystal layer LCL, but the disclosure is not limited hereto. In the embodiment, the first polarizer POL1 and the second polarizer POL2 have a first absorption axis AX1 and a second absorption axis AX2, respectively. The first absorption axis AX1 of the first polarizer POL1 is parallel to the second absorption axis AX2 of the second polarizer POL2.

In the embodiment, the first absorption axis AX1 and the second absorption axis AX2 may be parallel to the first alignment direction AD1 of the first alignment layer AL1 and the second alignment direction AD2 of the second alignment layer AL2. That is, the first absorption axis AX1 and the second absorption axis AX2 may be perpendicular to the viewing angle control direction VCD, but the disclosure is not limited hereto. In other embodiments, each absorption axis of the two polarizers may also be perpendicular to each alignment direction of the two alignment layers.

Further, the electrically controllable viewing angle switch device 200 may further include a first electrode layer EL1 and a second electrode layer EL2. The first electrode layer EL1 is disposed on the first substrate 201 and located between the first alignment layer AL1 and the first substrate 201. The second electrode layer EL2 is disposed on the second substrate 202 and located between the second alignment layer AL2 and the second substrate 202. In the embodiment, the first electrode layer EL1 and the second electrode layer EL2 are, for example, light-transmitting electrodes (i.e., transparent electrodes), such as whole-surface electrodes, and the material of the light-transmitting electrodes may include metal oxides, such as indium tin oxides, indium zinc oxides, aluminum tin oxides, aluminum zinc oxides, or other suitable oxides, or a stack of at least two of the foregoing.

Referring to FIG. 2 and FIG. 3, the spacers SP of the electrically controllable viewing angle switch device 200 are disposed between the first substrate 201 and the second substrate 202 to maintain the layer thickness uniformity of the liquid crystal layer LCL between the first substrate 201 and the second substrate 202. The spacers SP are dispersedly arranged on the first substrate 201 (e.g., the spacers SP are dispersedly arranged on the first electrode layer EL1 and located between the first electrode layer EL1 and the first alignment layer AL1, and the spacers SP are connected to the second alignment layer AL2 via the first alignment layer AL1. In other embodiment, the spacers SP are directly connected to the second alignment layer AL2). For example, the spacers SP may be arranged in multiple columns and multiple rows (i.e., array arrangement) along the direction X and the direction Y, and are spaced apart from each other, but the disclosure is not limited hereto. In another embodiment not shown, the spacer SP may also be disposed on the second substrate 202. In the embodiment, the spacer SP may be made of a transparent photoresist.

On the other hand, the light-shielding patterns BM of the electrically controllable viewing angle switch device 200 are disposed on the second substrate 202 and respectively overlap the spacers SP. The overlapping relationship here is, for example, that the spacer SP and the light-shielding pattern BM mutually overlap along the stacking direction (e.g., the direction Z) of the two substrates. If not specifically mentioned below, the overlapping relationship between the two components is defined in this way, and will not be repeated.

In the embodiment, the light-shielding pattern BM may be optionally formed between the second substrate 202 and the second electrode layer EL2, but the disclosure is not limited hereto. The material of the light-shielding pattern BM may include a black resin, a metal with low reflectivity (e.g., a chromium, a nickel, etc.) or other applicable materials (e.g., materials with reflectivity lower than 10%). The light-shielding pattern BM has a height H along the direction perpendicular to the display surface DS of FIG. 1 (i.e., the direction Z), and the height H is preferably greater than 0 μm and less than or equal to 0.1 μm.

It should be noted that, in the embodiment, since the orthographic projection area of the spacer SP on the second substrate 202 is less than the orthographic projection area of the light-shielding pattern BM on the second substrate 202, and the orthographic projection of the spacer SP on the second substrate 202 is located within the orthographic projection of the light-shielding pattern BM on the second substrate 202 overlapping the spacer SP, light leakages caused by the poor arrangement of the liquid crystal layer LCL near the spacer SP may be effectively reduced, thereby improving the display quality and the anti-peep effect of the display apparatus 10. In other embodiments, the orthographic projection area of the spacer SP on the second substrate 202 may also be equal to the orthographic projection area of the light-shielding pattern BM on the second substrate 202.

Further, referring to FIG. 2 and FIG. 3, in the embodiment, the orthographic profiles of the spacer SP and the light-shielding pattern BM on the second substrate 202, respectively, are circular (as shown in FIG. 3), and have a first circular diameter DA1 and a second circular diameter DA2. The second circular diameter DA2 of the light-shielding pattern BM may be greater than or equal to the first circular diameter DA1 of the spacer SP. Preferably, the second circular diameter DA2 of the light-shielding pattern BM may be increased by more than 10 μm compared to the first circular diameter DA1 of the spacer SP. However, the disclosure is not limited hereto. According to other embodiments, the orthographic profiles of the spacer and the light-shielding pattern on the substrate, respectively, may also be rectangular, polygonal or other suitable shapes, and the orthographic profile of the spacer may be different from the orthographic profile of the light-shielding pattern.

On the other hand, the spacer SP (e.g., the orthographic profile of the spacer SP) may be symmetrically disposed according to a first symmetry axis SX1, and the light-shielding pattern BM (e.g., the orthographic profile of the light-shielding pattern BM) may be symmetrically disposed according to a second symmetry axis SX2. The first symmetry axis SX1 and the second symmetry axis SX2 are perpendicular to the display surface DS of the display panel 100 in FIG. 1. In the embodiment, the first symmetry axis SX1 of the spacer SP and the second symmetry axis SX2 of the light-shielding pattern BM may be coincident (i.e., coaxial). From another point of view, the spacer SP has a first endpoint SPe1 and a second endpoint SPe2 opposite each other along the viewing angle control direction VCD, and the spacing between the first endpoint SPe1 and the second endpoint SPe2 is, for example, the first circular diameter DA1 of the spacer SP. The light-shielding pattern BM has a third endpoint BMe1 closer to the first endpoint SPe1 of the spacer SP and a fourth endpoint BMe2 closer to the second endpoint SPe2 of the spacer SP along the viewing angle control direction VCD. The spacing between the third endpoint BMe1 and the fourth endpoint BMe2 is, for example, the second circular diameter DA2 of the light-shielding pattern BM. In the embodiment, a spacing S1 (e.g., along the viewing angle control direction VCD) between the first endpoint SPe1 of the spacer SP and the third endpoint BMe1 of the light-shielding pattern BM may be equal to a spacing S2 (e.g., along the viewing angle control direction VCD) between the second endpoint SPe2 of the spacer SP and the fourth endpoint BMe2 of the light-shielding pattern BM, or the difference is less than 5%. Preferably, the spacing S1 and the spacing S2 are greater than or equal to 10 μm and less than or equal to 30 μm.

When the electrically controllable viewing angle switch device 200 is enabled, the transmittance distribution of light at each viewing angle is shown in FIG. 5. It may be seen from FIG. 5 that the electrically controllable viewing angle switch device 200 has an anti-peep effect within the viewing angle range of 40 degrees to 50 degrees (and −40 degrees to −50 degrees) in the horizontal direction (i.e., the direction X) of FIG. 5. In particular, by expanding the edge of the light-shielding pattern BM relative to the edge of the spacer SP, light leakage and the resulting impact on the anti-peep effect may be effectively reduced within the above-mentioned viewing angle range when the display apparatus 10 operates in the anti-peep mode.

Hereinafter, other embodiments may be listed to describe the disclosure in detail, and the same components may be marked with the same symbols. The description of the same technical content may be omitted. For the omitted parts, please refer to the foregoing embodiments, which will not be repeated below.

Figure 6:
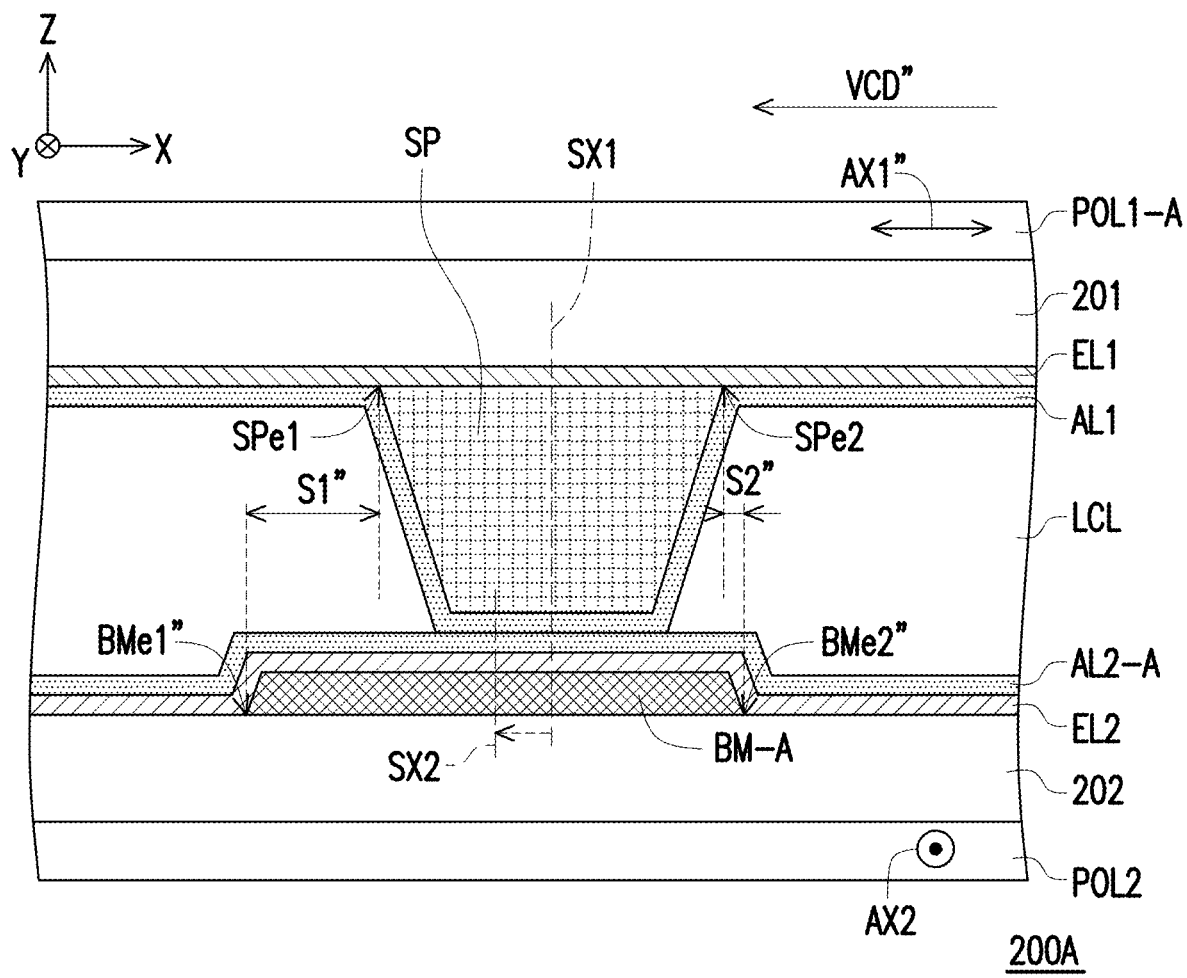
FIG. 6 is a schematic cross-sectional view of an electrically controllable viewing angle switch device according to a second embodiment of the disclosure.
Figure 7:
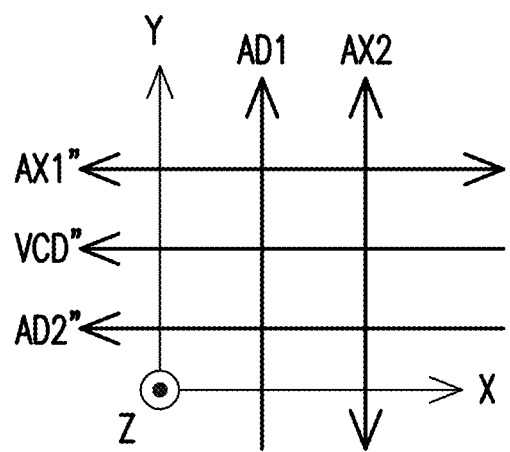
FIG. 7 is a schematic view of a relative relationship between an alignment direction of an alignment layer, an absorption axis of a polarizer, and a viewing angle control direction of the electrically controllable viewing angle switch device of FIG. 6.
Figure 8:
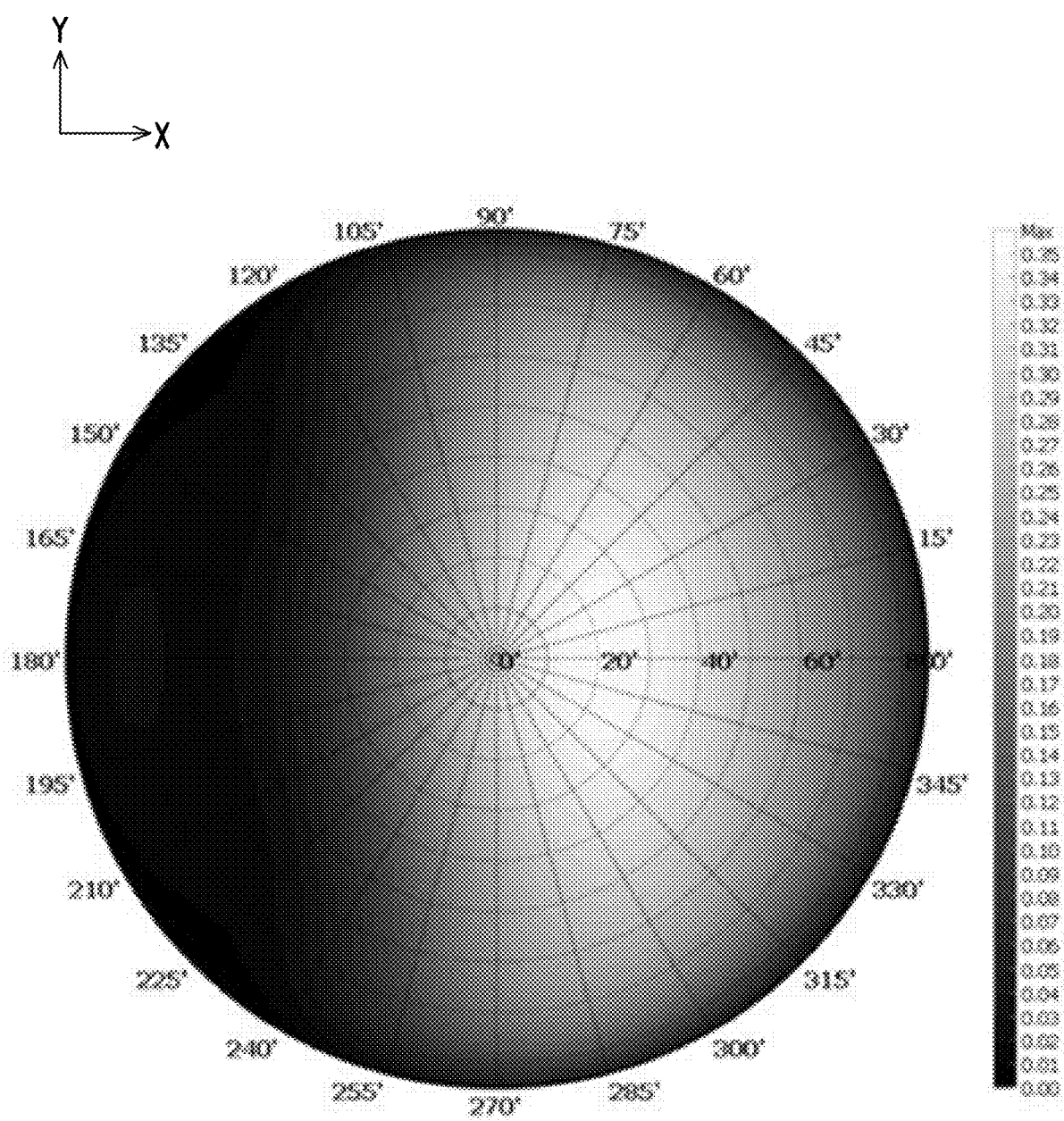
FIG. 8 is a transmittance distribution diagram of the electrically controllable viewing angle switch device of FIG. 6 operating in an anti-peep mode.
Figure 9:
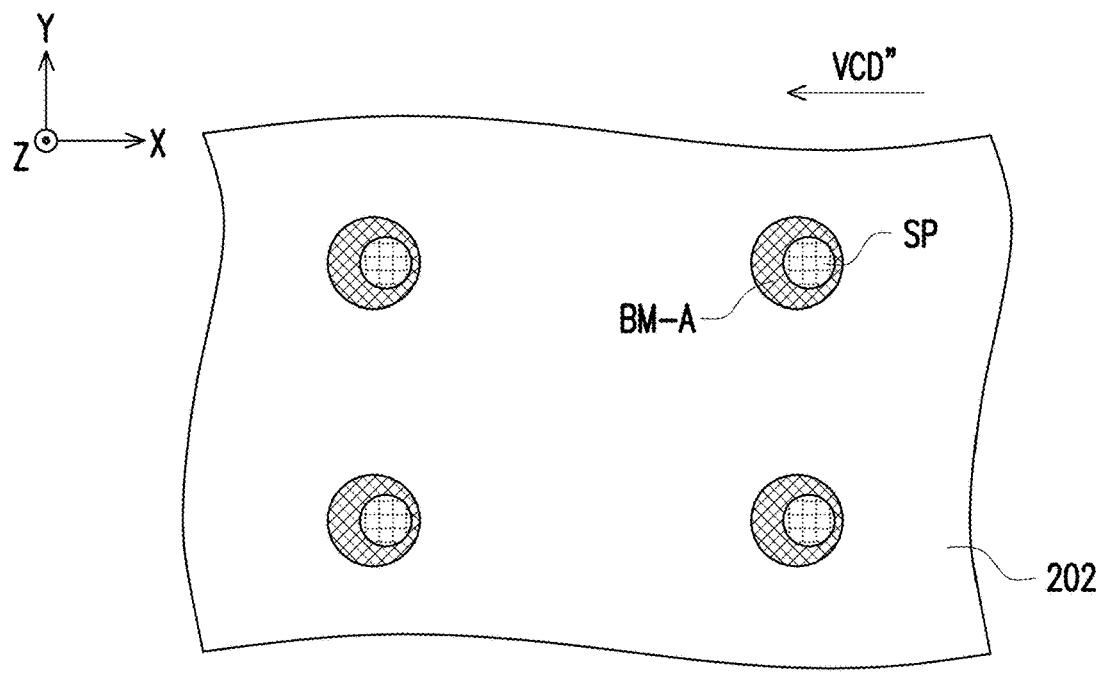
FIG. 9 is a schematic top view of the spacer and the light-shielding pattern of FIG. 6.

FIG. 6 is a schematic cross-sectional view of an electrically controllable viewing angle switch device according to a second embodiment of the disclosure. FIG. 7 is a schematic view of a relative relationship between an alignment direction of an alignment layer, an absorption axis of a polarizer, and a viewing angle control direction of the electrically controllable viewing angle switch device of FIG. 6. FIG. 8 is a transmittance distribution diagram of the electrically controllable viewing angle switch device of FIG. 6 operating in an anti-peep mode. FIG. 9 is a schematic top view of the spacer and the light-shielding pattern of FIG. 6.

Referring to FIGS. 6 and 7, the difference between the electrically controllable viewing angle switch device 200A of the embodiment and the electrically controllable viewing angle switch device 200 of FIG. 2 is that the alignment direction of the alignment layer, the absorption axis of the polarizer, and the configuration of the light-shielding pattern are different.

First of all, when the electrically controllable viewing angle switch device 200A of the embodiment is enabled, the transmittance distribution of light at each viewing angle is shown in FIG. 8. It may be seen from FIG. 8 that the electrically controllable viewing angle switch device 200A has an anti-peep effect within the viewing angle range of −40 degrees to −90 degrees in the horizontal direction (parallel to the direction X) of FIG. 8. That is, the display apparatus using the electrically controllable viewing angle switch device 200A of the embodiment may have a one-sided anti-peep function. Therefore, in the embodiment, a viewing angle control direction VCD" may be antiparallel to the direction X.

In detail, a second alignment direction AD2" of a second alignment layer AL2-A of the electrically controllable viewing angle switch device 200A may be perpendicular to the first alignment direction AD1 of the first alignment layer AL1, and an first absorption axis AX1" of a first polarizer POL1-A may be perpendicular to the second absorption axis AX2 of the second polarizer POL2. More specifically, the first absorption axis AX1" of the first polarizer POL1-A and the second alignment direction AD2" of the second alignment layer AL2-A in the embodiment are parallel to the viewing angle control direction VCD", but the disclosure is not limited hereto. In another embodiment not shown, the first alignment direction may be parallel to the viewing angle control direction VCD", and the second alignment direction may be perpendicular to the viewing angle control direction VCD".

On the other hand, the second symmetry axis SX2 of a light-shielding pattern BM-A of the electrically controllable viewing angle switch device 200A is offset relative to the first symmetry axis SX1 of the spacer SP overlapping the light-shielding pattern BM-A along the viewing angle control direction VCD" (for example, when the spacer SP and the light-shielding pattern BM-A mutually overlap, the direction of the first symmetry axis SX1 toward the second symmetry axis SX2 is parallel to the viewing angle control direction VCD"). From another point of view, the spacing S1" between a third endpoint BMe1" of the light-shielding pattern BM-A and the first endpoint SPe1 of the spacer SP is different from the spacing S2" between a fourth endpoint BMe2" of the light-shielding pattern BM-A and the second endpoint SPe2 of the spacer SP. In the embodiment, the spacing S1" is greater than the spacing S2", for example, greater than or equal to 1.5 times and less than 5 times.

That is to say, the degree to which the edge of the light-shielding pattern BM-A of the embodiment on the side of the anti-peep direction (i.e., the viewing angle control direction VCD", the direction −X) expands relative to the edge of the spacer SP is greater than the degree to which the edge of the light-shielding pattern BM-A on the side of the non anti-peep direction (e.g., the direction X) expands relative to the edge of the spacer SP (as shown in FIG. 9). Accordingly, light leakage within the viewing angle range of the display apparatus in the viewing angle control direction VCD" (i.e., −40 degrees to −90 degrees in the horizontal direction in FIG. 8) and the resulting impact on the anti-peep effect may be effectively reduced when one-side anti-peep is used.

Figure 10:
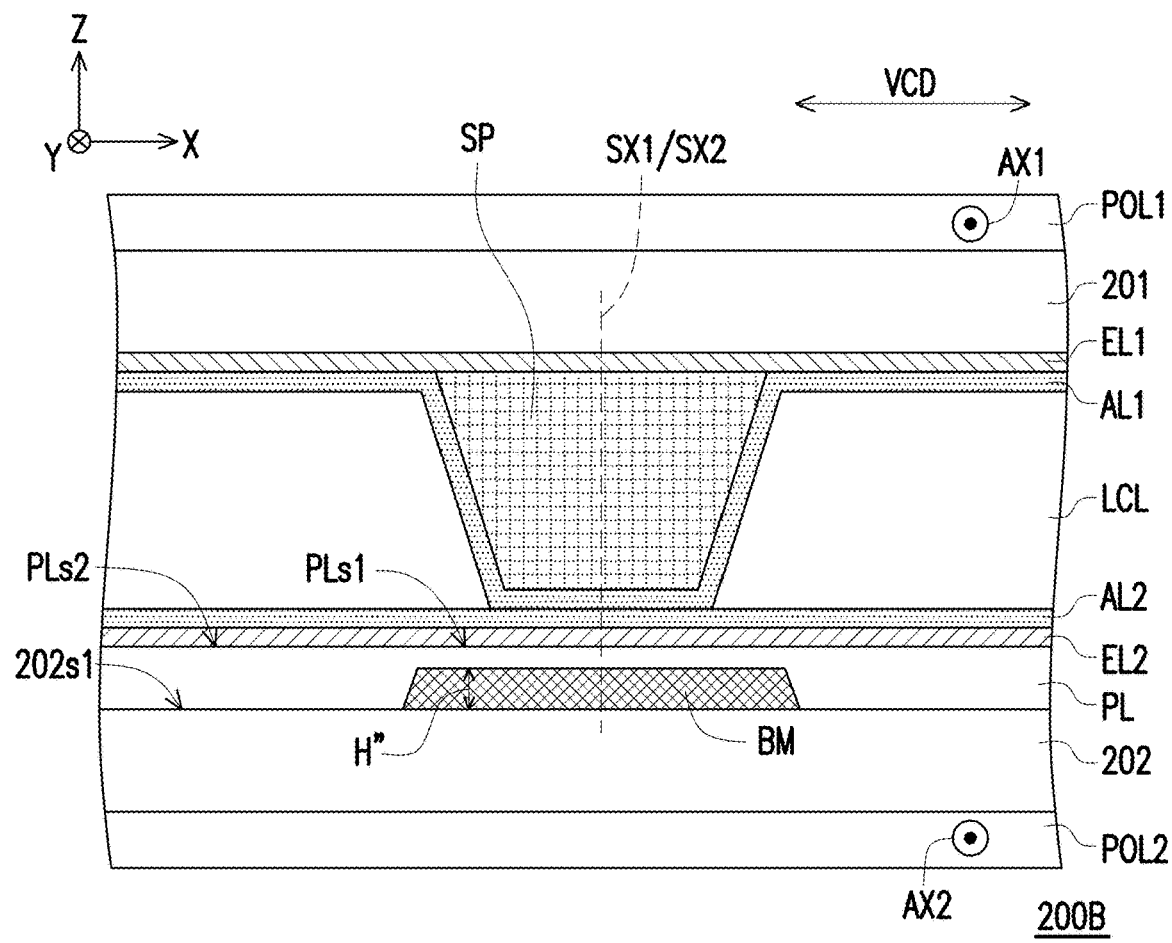
FIG. 10 is a schematic cross-sectional view of an electrically controllable viewing angle switch device according to a third embodiment of the disclosure.

FIG. 10 is a schematic cross-sectional view of an electrically controllable viewing angle switch device according to a third embodiment of the disclosure. Referring to FIG. 10, the difference between an electrically controllable viewing angle switch device 200B of the embodiment and the electrically controllable viewing angle switch device 200 of FIG. 2 is that the electrically controllable viewing angle switch device 200B of the embodiment may optionally include a planarization layer PL. The planarization layer PL is disposed on the second substrate 202 and covers the multiple light-shielding patterns BM. The second electrode layer EL2 and the second alignment layer AL2 are sequentially disposed on the planarization layer PL.

In the embodiment, a height H" of the light-shielding pattern BM along the direction perpendicular to the display surface DS of FIG. 1 is greater than 0.1 μm (e.g., 0.2 μm), and a side of the planarization layer PL facing away from the light-shielding pattern BM has a first surface PLs1 and a second surface PLs2. The first surface PLs1 overlaps the light-shielding pattern BM and the second surface PLs2 does not overlap the light-shielding pattern BM. Preferably, the height difference between the first surface PLs1 and the second surface PLs2 of the planarization layer PL relative to a substrate surface 202s1 of the second substrate 202 is greater than or equal to 0 μm and less than or equal to 0.1 μm. Therefore, the disposition of the planarization layer PL may effectively avoid light leakage caused by the poor arrangement of the liquid crystal layer LCL near the light-shielding pattern BM. In other embodiments, when the height H" of the light-shielding pattern BM is greater than 0.1 μm, the planarization layer PL is disposed on the second substrate 202 and does not overlap the light-shielding pattern BM (that is, the light-shielding pattern BM is disposed between the planarization layer PL). There is a planarization layer thickness between the second surface PLs2 of the planarization layer PL and the substrate surface 202s1. The planarization layer thickness is less than or equal to the height H" of the light-shielding pattern BM, and the difference between the planarization layer thickness and the height H" of the light-shielding pattern BM is greater than or equal to 0 μm and less than 0.1 μm.

Figure 11:
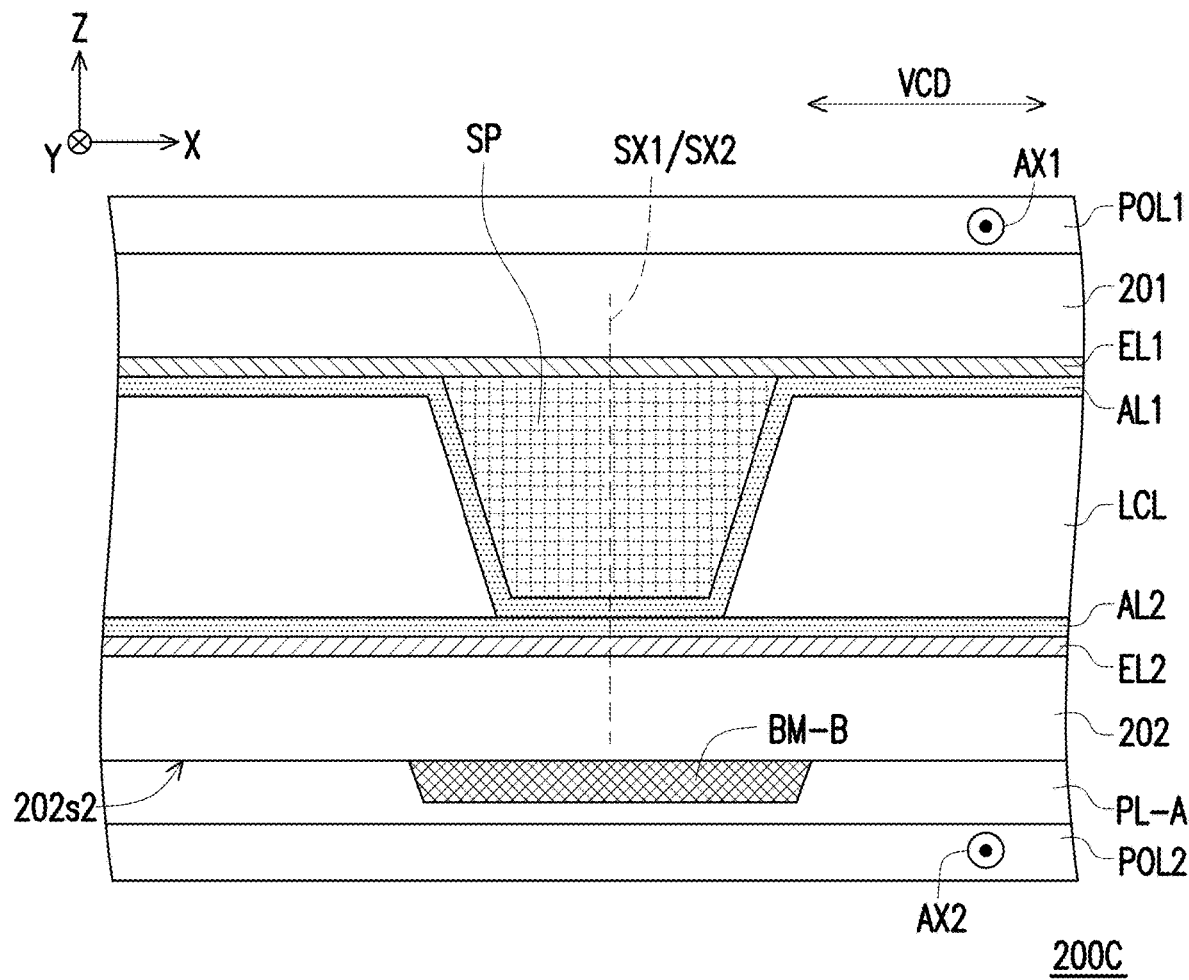
FIG. 11 is a schematic cross-sectional view of an electrically controllable viewing angle switch device according to a fourth embodiment of the disclosure.

FIG. 11 is a schematic cross-sectional view of an electrically controllable viewing angle switch device according to a fourth embodiment of the disclosure. Referring to FIG. 11, the only difference between an electrically controllable viewing angle switch device 200C of the embodiment and the electrically controllable viewing angle switch device 200B of FIG. 10 is that the configuration of the light-shielding pattern is different. Specifically, a light-shielding pattern BM-B of the electrically controllable viewing angle switch device 200C is disposed on a substrate surface 202s2 of the second substrate 202 facing away from the liquid crystal layer LCL. Correspondingly, a planarization layer PL-A is also disposed on the substrate surface 202s2 of the second substrate 202 and covers the multiple light-shielding patterns BM-B.

Figure 12:
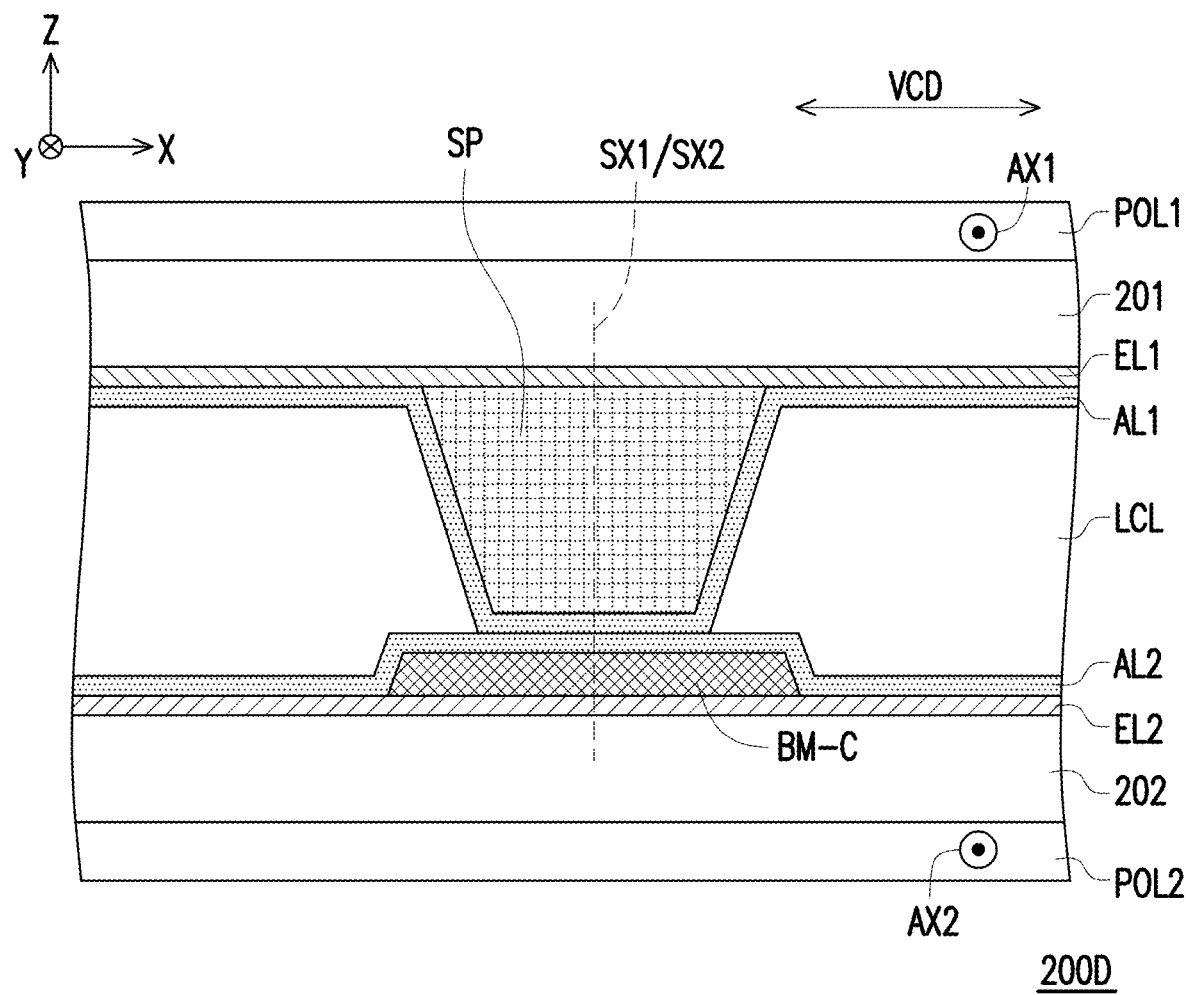
FIG. 12 is a schematic cross-sectional view of an electrically controllable viewing angle switch device according to a fifth embodiment of the disclosure.

FIG. 12 is a schematic cross-sectional view of an electrically controllable viewing angle switch device according to a fifth embodiment of the disclosure. Referring to FIG. 12, the only difference between an electrically controllable viewing angle switch device 200D of the embodiment and the electrically controllable viewing angle switch device 200 of FIG. 2 is that the configuration of the light-shielding pattern is different. Different from the light-shielding pattern BM in FIG. 2, which is disposed between the second substrate 202 and the second electrode layer EL2, in the embodiment, a light-shielding pattern BM-C of the electrically controllable viewing angle switch device 200D is disposed between the second electrode layer EL2 and the second alignment layer AL2.

To sum up, in the display apparatus of the embodiment of the disclosure, the electrically controllable viewing angle switch device is further provided with the light-shielding patterns in an area provided with the spacers, and the orthographic projection of the spacers on the substrate is located within the orthographic projection of the light-shielding patterns on the substrate. Accordingly, light leakage caused by the poor arrangement of the liquid crystal layer near the spacers may be effectively reduced, thereby improving the display quality and the anti-peep effect of the display apparatus.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations may be apparent to practitioners skilled in this art. The embodiments are chosen and described in order to best explain the principles of the disclosure and its best mode practical application, thereby enabling persons skilled in the art in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which may allow a searcher to quickly ascertain the subject matter of the technical disclosure of any patent issued from this disclosure. It is submitted with the understanding that it may not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A display apparatus, comprising:
    a display panel, having a display surface; and
    an electrically controllable viewing angle switch device, disposed to overlap the display surface of the display panel, wherein the electrically controllable viewing angle switch device comprises:
        a first substrate and a second substrate, overlapped with each other;
        a liquid crystal layer, disposed between the first substrate and the second substrate;
        a plurality of spacers, disposed between the first substrate and the second substrate; and
        a plurality of light-shielding patterns, disposed on the second substrate, wherein an orthographic projection area of each of the spacers on the second substrate is less than or equal to an orthographic projection area of each of the light-shielding patterns on the second substrate, and an orthographic projection of the spacers on the second substrate is located within an orthographic projection of the light-shielding patterns on the second substrate,
    wherein the electrically controllable viewing angle switch device has a viewing angle control direction, each of the spacers of the electrically controllable viewing angle switch device is symmetrically disposed according to a first symmetry axis, each of the light-shielding patterns is symmetrically disposed according to a second symmetry axis, and the second symmetry axis of any one of the light-shielding patterns is offset relative to the first symmetry axis of one of the spacers overlapping any one of the light-shielding patterns along the viewing angle control direction, and
    the viewing angle control direction is unidirectional, and parallel with a direction from the first symmetry axis toward the second symmetry axis.

2. The display apparatus according to claim 1, wherein the electrically controllable viewing angle switch device further comprises:
    a first alignment layer, disposed on the first substrate, and having a first alignment direction;
    a second alignment layer, disposed on the second substrate, and having a second alignment direction, wherein the second alignment direction is antiparallel or parallel to the first alignment direction; and
    a first polarizer and a second polarizer, respectively disposed on opposite sides of the liquid crystal layer, wherein the first polarizer has a first absorption axis, the second polarizer has a second absorption axis, and the first absorption axis is parallel to the second absorption axis.

3. The display apparatus according to claim 1, wherein the electrically controllable viewing angle switch device further comprises:

a first alignment layer, disposed on the first substrate, and having a first alignment direction;

a second alignment layer, disposed on the second substrate, and having a second alignment direction, wherein the first alignment direction is perpendicular to the second alignment direction; and a first polarizer and a second polarizer, respectively disposed on opposite sides of the liquid crystal layer, wherein the first polarizer has a first absorption axis, the second polarizer has a second absorption axis, and the first absorption axis is perpendicular to the second absorption axis.

4. The display apparatus according to claim 1, wherein each of the spacers of the electrically controllable viewing angle switch device has a first endpoint and a second endpoint opposite each other along the viewing angle control direction, each of the light-shielding patterns has a third endpoint closer to the first endpoint and a fourth endpoint closer to the second endpoint along the viewing angle control direction, and a spacing between the first endpoint and the third endpoint is different from a spacing between the second endpoint and the fourth endpoint.

5. The display apparatus according to claim 1, wherein each of the light-shielding patterns of the electrically controllable viewing angle switch device has a height along a direction perpendicular to the display surface, and the height is less than or equal to 0.1 µm.

6. The display apparatus according to claim 1, the electrically controllable viewing angle switch device further comprises a planarization layer disposed on the second substrate and covering the light-shielding patterns, each of the light-shielding patterns has a height along a direction perpendicular to the display surface, and the height is greater than 0.1 µm.

7. The display apparatus according to claim 6, wherein the planarization layer of the electrically controllable viewing angle switch device has a first surface and a second surface facing away from the light-shielding patterns, the first surface overlaps the light-shielding patterns, the second surface does not overlap the light-shielding patterns, and a height difference between the first surface and the second surface relative to a substrate surface of the second substrate is less than or equal to 0.1 µm.

8. The display apparatus according to claim 1, wherein the electrically controllable viewing angle switch device further comprises:

a first alignment layer and a second alignment layer, respectively disposed on the first substrate and the second substrate;

a first electrode layer, disposed on the first substrate, and located between the first alignment layer and the first substrate; and a second electrode layer, disposed on the second substrate, and located between the second alignment layer and the second substrate, wherein the light-shielding patterns are disposed between the second substrate and the second electrode layer or between the second electrode layer and the second alignment layer.

9. The display apparatus according to claim 1, wherein the light-shielding patterns are disposed on a substrate surface of the second substrate facing away from the liquid crystal layer.

10. An electrically controllable viewing angle switch device, wherein the electrically controllable viewing angle switch device comprises:

a first substrate and a second substrate, overlapped with each other;

a liquid crystal layer, disposed between the first substrate and the second substrate;

a plurality of spacers, disposed between the first substrate and the second substrate; and a plurality of light-shielding patterns, disposed on the second substrate, wherein an orthographic projection area of each of the spacers on the second substrate is less than or equal to an orthographic projection area of each of the light-shielding patterns on the second substrate, and an orthographic projection of each of the spacers on the second substrate is located within an orthographic projection of each of the light-shielding patterns on the second substrate, wherein the electrically controllable viewing angle switch device has a viewing angle control direction, each of the spacers of the electrically controllable viewing angle switch device is symmetrically disposed according to a first symmetry axis, each of the light-shielding patterns is symmetrically disposed according to a second symmetry axis, and the second symmetry axis of any one of the light-shielding patterns is offset relative to the first symmetry axis of one of the spacers overlapping any one of the light-shielding patterns along the viewing angle control direction, and the viewing angle control direction is unidirectional, and parallel with a direction from the first symmetry axis toward the second symmetry axis.

* * * * *